United States Patent
Archer et al.

(10) Patent No.: US 8,250,164 B2
(45) Date of Patent: Aug. 21, 2012

(54) QUERY PERFORMANCE DATA ON PARALLEL COMPUTER SYSTEM HAVING COMPUTE NODES

(75) Inventors: Charles J. Archer, Rochester, MN (US); Michael A. Blocksome, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 12/760,783

(22) Filed: Apr. 15, 2010

(65) Prior Publication Data

US 2011/0258281 A1 Oct. 20, 2011

(51) Int. Cl.
*G06F 15/16* (2006.01)
(52) U.S. Cl. .......... 709/208; 709/210; 709/212; 707/10; 710/22; 710/25
(58) Field of Classification Search .......... 709/208–214; 707/10
See application file for complete search history.

(56) References Cited

U.S. PATENT DOCUMENTS

| 7,694,035 B2* | 4/2010 | Chen et al. ............... 710/22 |
| 7,805,546 B2* | 9/2010 | Archer et al. ............. 710/22 |
| 7,844,620 B2* | 11/2010 | Barsness et al. .......... 707/764 |
| 8,112,559 B2* | 2/2012 | Blocksome et al. ....... 710/22 |
| 2007/0088886 A1* | 4/2007 | Conner ................... 710/244 |
| 2008/0178177 A1* | 7/2008 | Archer et al. ............ 718/100 |
| 2009/0006546 A1 | 1/2009 | Blumrich et al. |
| 2009/0077011 A1* | 3/2009 | Natarajan et al. ........ 707/2 |
| 2009/0119304 A1* | 5/2009 | Preslan et al. ........... 707/10 |
| 2009/0132609 A1* | 5/2009 | Barsness et al. ......... 707/203 |
| 2010/0082848 A1 | 4/2010 | Blocksome et al. |

OTHER PUBLICATIONS

International Search Report and Written Opinion for the PCT filing of ROC920090036US1.
Smeds, Nils "A PAPI Implementation for BlueGene", Jun. 18, 2006, Applied Parallel Computing, State of the Art in Scientific Computing, Springer Berlin Heidelberg, pp. 1036-1044.
Salapura, Valentina et al. "Next-Generation Performance Counters: Towards Monitoring Over Thousand Concurrent Events", IEEE International Symposium on Performance Analysis of Systems and Software, 2008, ISPASS 2008, Piscataway, New Jersey, USA, Apr. 20, 2008, pp. 139-146.

\* cited by examiner

*Primary Examiner* — Wing Chan
*Assistant Examiner* — Razu Miah
(74) *Attorney, Agent, or Firm* — Patterson & Sheridan LLP

(57) ABSTRACT

Embodiments of the invention provide a method for querying performance counter data on a massively parallel computing system, while minimizing the costs associated with interrupting computer processors and limited memory resources. DMA descriptors may be inserted into an injection FIFO of a remote compute node in the massively parallel computing system. Upon executing the DMA operations described by the DMA descriptors, performance counter data may be transferred from the remote compute node to a destination node.

3 Claims, 6 Drawing Sheets

QUERY PERFORMANCE DATA ON PARALLEL COMPUTER SYSTEM HAVING COMPUTE NODES

BACKGROUND

1. Field

Embodiments of the invention relate generally to parallel processing and more particularly to a technique for using a DMA reflect operation to unobtrusively query remote performance data.

2. Description of the Related Art

Powerful computers may be designed as highly parallel systems where the processing activity of hundreds, if not thousands, of processors (CPUs) are coordinated to perform computing tasks. These systems are highly useful for a broad variety of applications, including financial modeling, hydrodynamics, quantum chemistry, astronomy, weather modeling and prediction, geological modeling, prime number factoring, and image processing (e.g., CGI animations and rendering), to name but a few examples.

International Business Machines (IBM) has developed one family of parallel computing systems under the name Blue Gene®. The various Blue Gene architectures provide a scalable, parallel computer system. For instance, the Blue Gene/P system may be configured with a maximum of 256 racks, housing 8,192 node cards and 884,736 PowerPC 450 processors. The Blue Gene/P architecture has been successful and on Nov. 12, 2007, IBM announced that a Blue Gene/P system at Jülich Research Centre reached an operational speed of 167 Teraflops (167 trillion floating-point operations per second), making it the fastest computer in Europe at that time. Further, as of June 2008, the Blue Gene/P installation at Argonne National Laboratory achieved a speed of 450.3 Teraflops, making it the then third fastest computer in the world.

The compute nodes in a parallel system typically communicate with one another over multiple communication networks. For example, the compute nodes of a Blue Gene/P system are interconnected using five specialized networks. The primary communication strategy for the Blue Gene/P system is message passing over a torus network (i.e., a set of point-to-point links between pairs of nodes). The torus network allows application programs developed for parallel processing systems to use high level interfaces such as Message Passing Interface (MPI) and Aggregate Remote Memory Copy Interface (ARMCI) to perform computing tasks and distribute data among a set of compute nodes. Of course, other message passing interfaces have been (and are being) developed. Other parallel architectures also use MPI and ARMCI for data communication between compute nodes connected via a variety of network topologies. Typically, MPI messages are encapsulated in a set of packets which are transmitted from a source node to a destination node over a communications network (e.g., the torus network of a Blue Gene system).

Additionally, the compute nodes may contain various FIFOs in their local memory. For instance, the nodes may contain an injection FIFO in which commands may be stored. The node may monitor the injection FIFO to determine when commands have been added to the FIFO. For instance, a head pointer and a tail pointer may be used to monitor the FIFO. When the FIFO contains one or more commands, the node may then begin to execute those commands. The nodes may also contain other FIFOs, such as FIFOs containing data to be written to memory.

SUMMARY

One embodiment of the invention includes a method for querying performance counter data on a parallel computing system having a plurality of compute nodes. The method may generally include receiving, on a first compute node, from a second compute node, a first direct memory access (DMA) descriptor. The first DMA descriptor identifies performance counter data to be sent to a third compute node. The method may also include inserting the first DMA descriptor into an injection queue on the first compute node, executing an operation described by the first DMA descriptor on the first compute node to determine the performance counter data, and sending the performance counter data from the first compute node to the third compute node.

Another embodiment of the invention includes a computer-readable storage medium containing a program which, when executed, performs an operation for querying performance counter data on a parallel computing system having a plurality of compute nodes. The operation may generally include receiving, on a first compute node, from a second compute node, a first direct memory access (DMA) descriptor. The first DMA descriptor identifies performance counter data to be sent to a third compute node. The operation may also include inserting the first DMA descriptor into an injection queue on the first compute node, executing an operation described by the first DMA descriptor on the first compute node to determine the performance counter data, and sending the performance counter data from the first compute node to the third compute node.

Yet another embodiment of the invention includes a parallel computing system. The system may generally include a plurality of compute nodes, where each compute includes at least a processor, a memory, and a DMA controller configured to perform an operation for querying performance counter data from other compute nodes in the parallel computing system. The operation itself may generally include receiving, on a first compute node, from a second compute node, a first direct memory access (DMA) descriptor. The first DMA descriptor identifies performance counter data to be sent to a third compute node. The operation may further include inserting the first DMA descriptor into an injection queue stored in the memory on the first compute node, executing an operation described by the first DMA descriptor on the first compute node to determine the performance counter data, and sending the performance counter data from the first compute node to the third compute node.

Still another embodiment includes a method of performing a fence operation on a parallel computing system having a plurality of compute nodes. This method may generally include sending a first DMA descriptor from a first compute node to a second compute node, where the first DMA descriptor identifies transfer data to be transferred to the first compute node. This method may also include sending a second DMA descriptor from the first compute node to the second compute node, where the second DMA descriptor contains a fence identifier to be transferred to the first compute node, and wherein the second DMA descriptor is sent after the first DMA descriptor. This method may also include receiving the transfer data on the first compute node from the second compute node, where the transfer data was transferred as a result of the second compute node processing the first DMA descriptor. And also include receiving the reflect identifier on the first compute node from the second compute node, wherein the reflect identifier was transferred as a result of the second compute node processing the second DMA descriptor.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
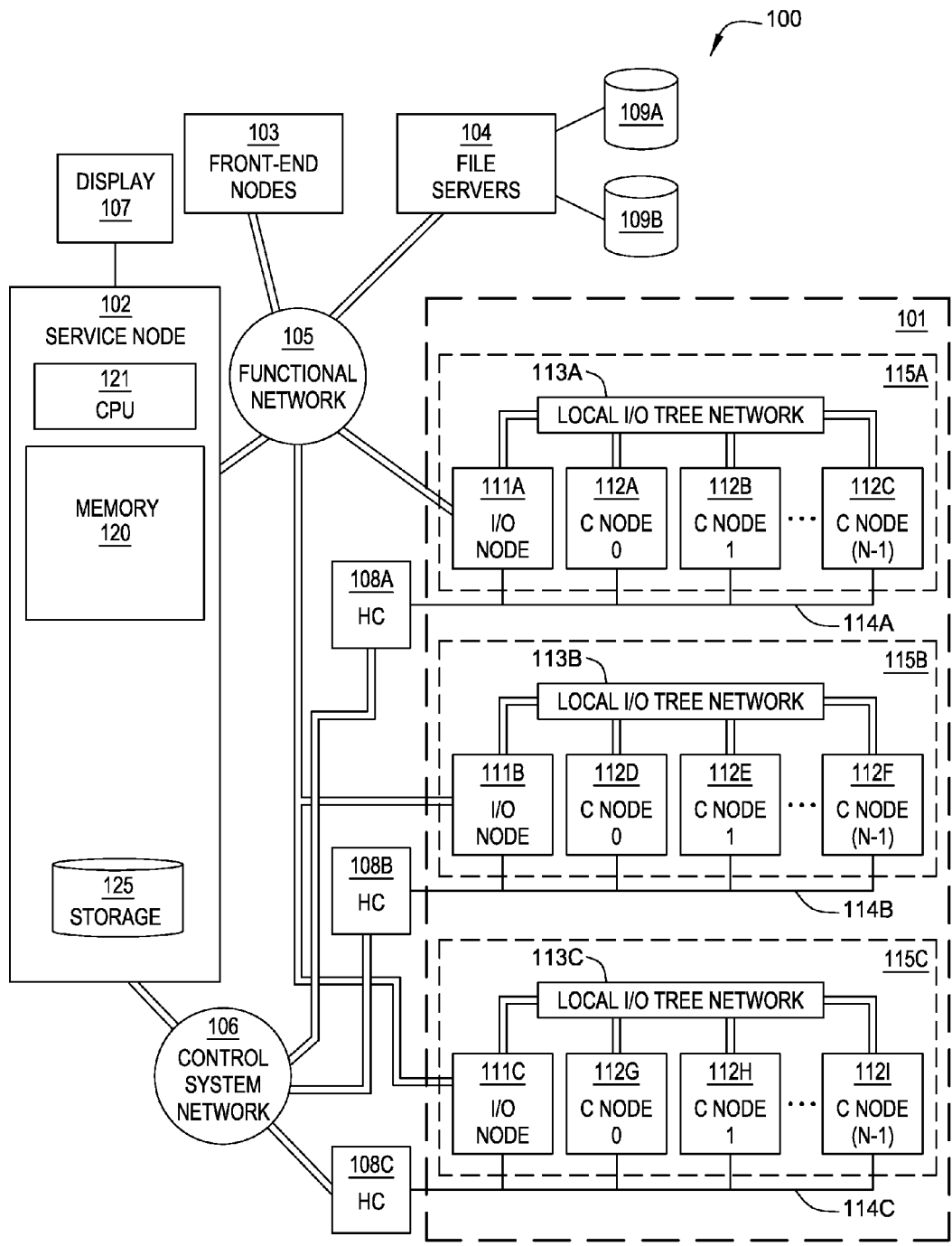
FIG. 1 is a high-level block diagram of components of a massively parallel computer system, according to one embodiment of the present invention.

Distributed systems, such as a Blue Gene system, provide tremendous computing power by coordinating the activity of thousands of processors. On very large parallel computing systems such as this, seemingly simple calculations that take place on every node can be expensive in terms of resources when viewed in the aggregate. For example, each node may keep a counter of incoming and outgoing messages to every other node for use in, for instance, send and fence operations. However, keeping these counters consumes memory space on each node and additionally requires the CPU on each node to increment these counters any time a message is sent or received. While such an operation might seem (and generally is) trivial for a single node, in an environment with tens of thousands of nodes actively communicating with one another, an operation such as this can consume substantial amounts of memory and processing time for the system as a whole.

Embodiments of the invention provide a method for unobtrusively querying data on a remote node while minimizing the CPU usage of the origin node and the remote node. For example, embodiments of the invention may be used to query performance counter data from a remote node of a parallel computing system, such as the Blue Gene architecture developed by IBM. Of course, embodiments of the invention may be adapted for use with other parallel systems as well.

In one embodiment, an origin node sends a DMA descriptor containing destination node information to a remote node. This DMA descriptor may contain a command, such as an RPUT command, indicating that the remote node should send data to the designated destination node. For example, the DMA descriptor could specify that the remote node should send performance data from a specified memory address on the remote node. Upon receiving the DMA descriptor, the remote node may place the command in a local injection FIFO. When the remote node processes the command in the injection FIFO, the RPUT command may be executed, transferring the specified data to the destination node. The destination node then subsequently receives the data and then subsequently places it in a memory FIFO on the destination node.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a high-level block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a plurality of compute nodes 112 arranged in a regular array or matrix. Compute nodes 112 carry out the processing for the useful work performed by system 100. The operation of computer system 100, including compute core 101, may be controlled by service node 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute software applications written for parallel processing. I/O nodes 111 handle I/O operations on behalf of compute nodes 112. For example, the I/O node 111 may retrieve data from file servers 104 requested by one of compute nodes 112. Each I/O node 111 may include a processor and interface hardware that handles I/O operations for a set of N compute nodes 112, wherein the I/O node and its respective set of N compute nodes are referred to as a Pset. Compute core 101 contains M Psets 115A-C, each including a single I/O node 111 and N compute nodes 112, for a total of M×N compute nodes 112. The product of M×N can be very large. For example, in one implementation M=1024 (1K) and N=64, for a product of 64K compute nodes.

In general, application programming code and other data input required by compute core 101 to execute user applications, as well as data output produced by the compute core 101, are communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105, are used for data I/O, although they are physically separated from functional network 105.

Service node 102 may be configured to direct the operation of the compute nodes 112 in compute core 101. In one embodiment, service node 102 is a computer system that includes one or more processors 121, internal memory 120, and local storage 125. An attached console 107 (e.g., a keyboard, mouse, and display) may be used by a system administrator or similar person to initialize computing jobs on compute core 101. Service node 102 may also include an internal database which maintains state information for the compute nodes in core 101, and an application which may be configured to, among other things, control the allocation of hardware in compute core 101, direct the loading of data on compute nodes 111, migrate process running on one of compute nodes 112 to another one of compute nodes 112, and perform various diagnostic and maintenance functions.

In one embodiment, service node 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate.

In addition to service node 102, front-end nodes 103 provide computer systems used to perform auxiliary functions which, for efficiency or otherwise, are best performed outside compute core 101. Functions which involve substantial I/O operations are generally performed in the front-end nodes 103. For example, interactive data input, application code editing, or other user interface functions are generally handled by front-end nodes 103, as is application code compilation. Front-end nodes 103 are also connected to functional network 105 and may communicate with file servers 104.

Figure 2:
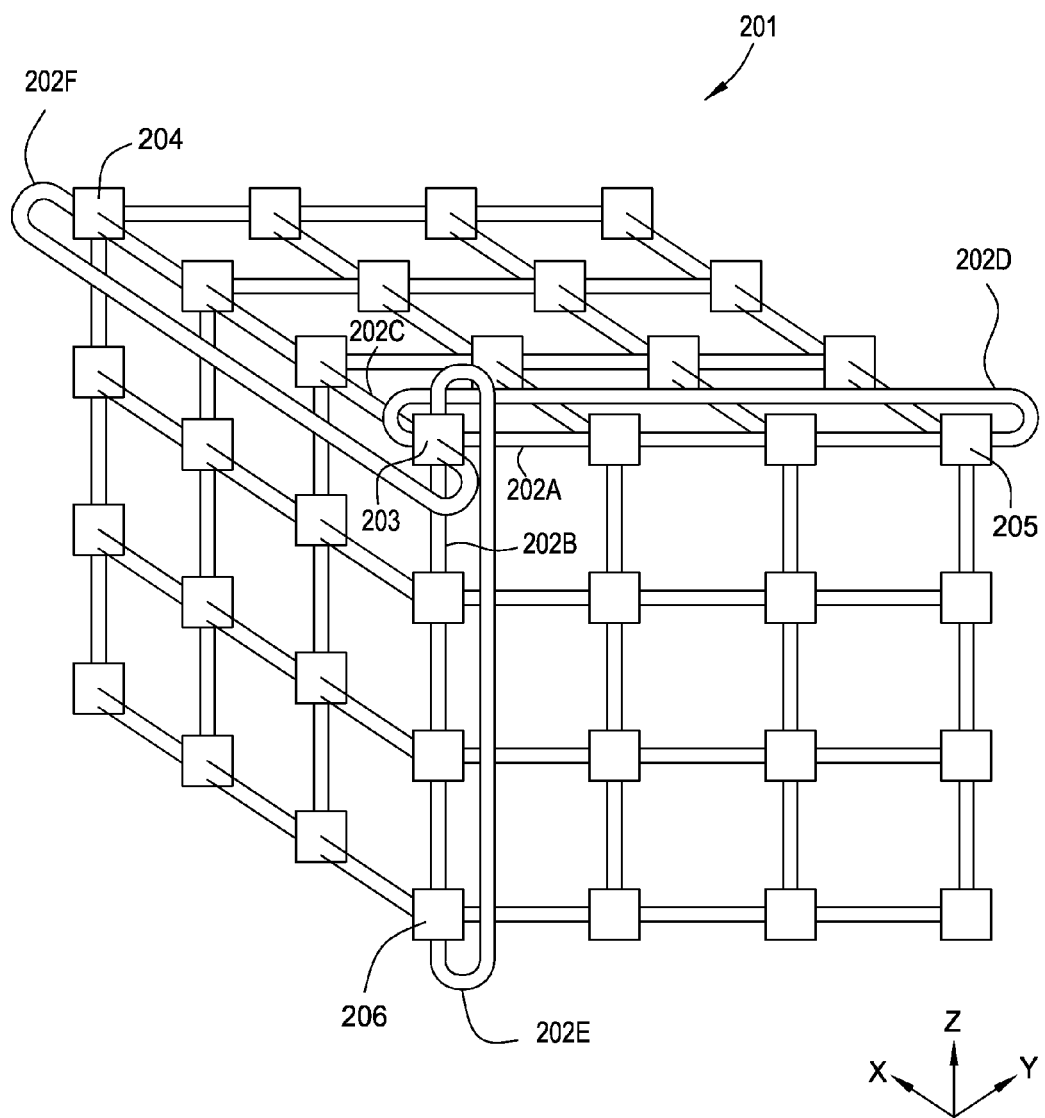
FIG. 2 is a conceptual illustration of a three dimensional torus network of the system of FIG. 1, according to one embodiment of the invention.

As stated, in a massively parallel computer system 100, compute nodes 112 may be logically arranged in a three-dimensional torus, where each compute node 112 may be identified using an x, y and z coordinate. FIG. 2 illustrates an example of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/P system includes 8,192 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a neighbor is any node linked via a path which does not have to traverse another node. The compute nodes may be linked in a three-dimensional torus 201, as shown in FIG. 2, but may also be configured to have more or fewer dimensions. Also, it is not necessarily the case that a given node's neighbors are the nodes physically closest to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from compute node 203 to other end of compute core 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

Figure 3:
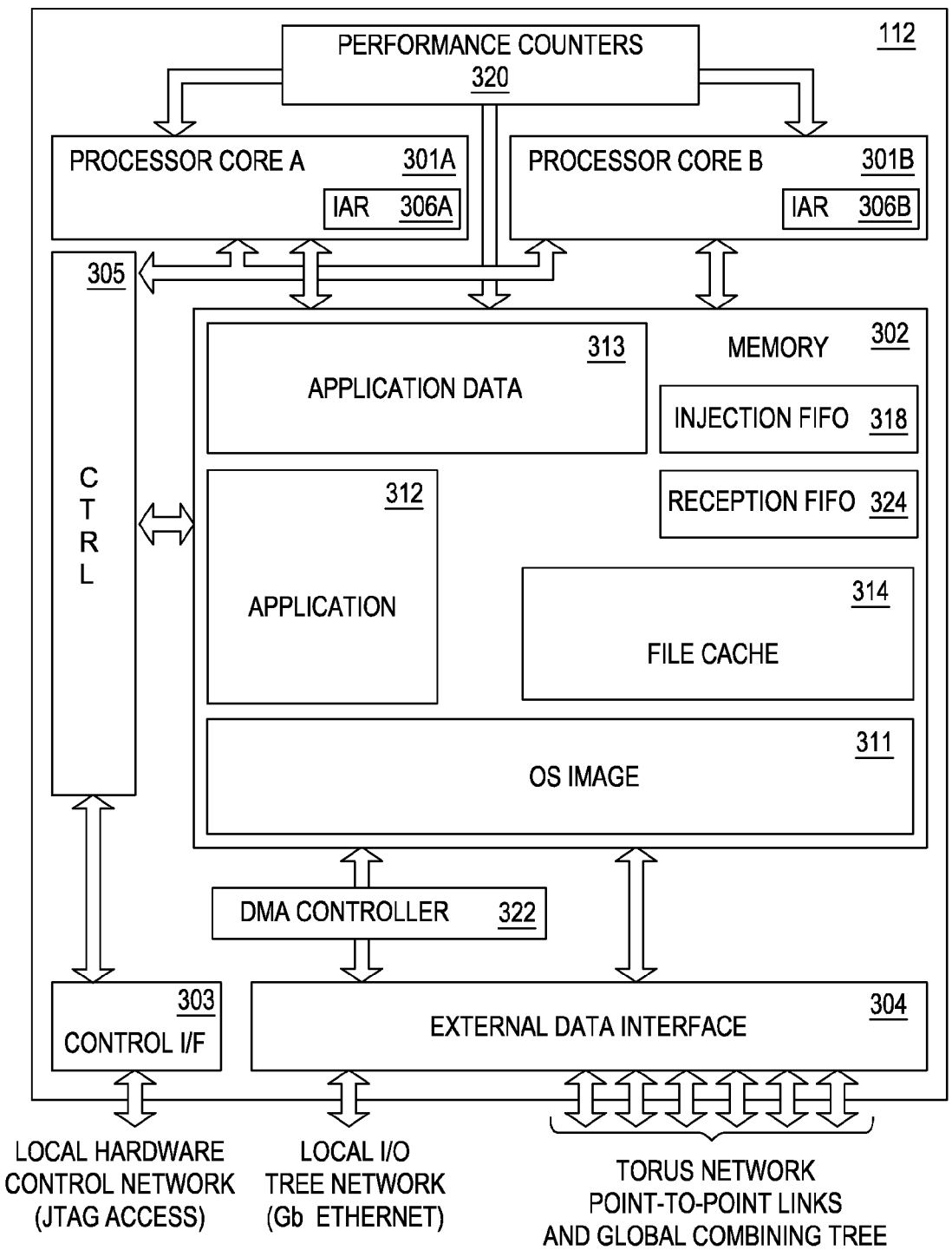
FIG. 3 is a high-level diagram of a compute node of the system of FIG. 1, according to one embodiment of the invention.

FIG. 3 is a high-level diagram of a compute node 112 of the system 100 of FIG. 1, according to one embodiment of the invention. As shown, compute node 112 includes processor cores 301A and 301B, each having an instruction address register 306A and 306B. Compute node 112 also includes memory 302 used by both processor cores 301; an external control interface 303 which is coupled to local hardware control network 114 (e.g., control system network 106); an external data communications interface 304 which is coupled to the corresponding local I/O tree network 113 (e.g., functional network 105) and the corresponding six node-to-node links 202 of the torus network 201; and includes monitoring and control logic 305 which receives and responds to control commands received through external control interface 303. Monitoring and control logic 305 may access processor cores 301 and locations in memory 302 on behalf of service node 102 to read (or in some cases alter) the operational state of node 112. In one embodiment, each compute node 112 may be physically implemented as a single integrated circuit.

As described, functional network 105 may service many I/O nodes 113, and each I/O node 113 is shared by a group of compute nodes 112 (i.e., a Pset). Thus, it is apparent that the I/O resources of parallel system 100 are relatively sparse when compared to computing resources. Although it is a general purpose computing machine, parallel system 100 is designed for maximum efficiency in applications which are computationally intense.

Additionally, compute node 112 includes performance counters 320 which maintain performance metrics for the compute node 112. For example, the performance counters 320 may contain counter data such as network congestion or cache misses specific to compute node 112. Of course, the performance counters may be configured to monitor a broad variety of events, parameters, counters or other characteristics of the processing that occurs on a compute node 112. The performance counters 320 may comprise a special memory-mapped region, special-purpose registers or any other suitable method for maintaining performance data.

Compute node 112 also includes DMA controller 322 which performs various DMA operations for the compute node 112. For example, DMA controller 322 may process a variety of DMA descriptors such as direct puts and remote get DMA operations. By using DMA controller 322 to execute all the DMA operations for compute node 112, DMA operations may be completed without interrupting the processor cores 301. The DMA controller 322 may be associated with various queues, also referred to herein as FIFOs (first in, first out), such as an injection FIFO 318 or reception FIFO 324. FIFOs 318, 324 serve as a buffer between the DMA controller 322 and the other components of compute node 112. That is, the FIFOs provide a place to store data until a particular operation can be completed. For instance, without the reception FIFO 324, a data transfer may have to wait on busy resources to free up before the transfer can be completed. In such a scenario, the transfer operation cannot finish until the resources become available. However, by the use of the FIFOs, the data may be inserted into the reception FIFO 324, thus completing the transfer DMA operation, and then the data may be moved from the FIFO 324 to its destination once the busy resources are available. This allows DMA operations to complete without regard to whether system resources are busy or not, thus resulting in more efficient DMA operations.

As shown in FIG. 3, memory 302 includes the injection FIFO 318. The injection FIFO 318 may contain DMA descriptors which describe DMA operations that are executed by the DMA controller 322 in the order that they are added to the injection FIFO 318. Once the DMA controller 322 executes an operation described by a given DMA descriptor from the injection FIFO 318, that descriptor is then removed from the FIFO 318. The DMA descriptors may be inserted into the FIFO by applications 312 running on the compute node 112. Remote compute nodes 112 in the compute core 101 may also insert DMA descriptors into the injection FIFO 318 using a DMA operation. For instance, a first compute node 112A may perform a DMA operation and write a DMA descriptor into the injection FIFO 318 of a second compute node 112B. Then, at some later point in time, once any DMA operations associated with any previously-inserted DMA descriptors in the injection FIFO 318 are executed, the DMA controller 322 on the second node 112B executes the DMA operation described by the DMA descriptor inserted by the first compute node 112. The injection FIFO 318 may be maintained using head and tail pointers, which are modified whenever a DMA descriptor is added or removed from the injection FIFO 318. However, this use of head and tail pointers is for illustrative purposes only and is not intended as a limitation, as one of ordinary skill in the art will recognize that other techniques may be used to implement the injection FIFO 318.

Additionally, memory 302 stores an operating system image 311, application(s) 312, and user application data structures 313, as required. Illustratively, memory 302 also includes a file cache 314, i.e., a cache of data read from or to be written to an I/O file. Operating system image 311 provides a copy of a simplified-function operating system running on compute node 112, referred to as a compute node kernel. Operating system image 311 may include a minimal set of functions required to support operation of the compute node 112. In a Blue Gene system, for example, operating system image 311 contains a Linux®-like operating system kernel customized to run on compute node 112. Of course, a variety of operating system kernels may be used, and further it is not necessary that all nodes employ the same operating system. (Also note, Linux® is a registered trademark of Linus Torvalds in the United States and other countries.)

As part of ongoing operations, application 312 may be configured to transmit messages from compute node 112 to other compute nodes in parallel system 100. For example, the MPI call of MPI_Send( ); may be used by application 312 to transmit a message from one compute node to another. On the other side of the communication, the receiving compute node may use the MPI call MPI_Receive( ); to receive the message. As described above, in a Blue Gene system, the external data interface 304 transmits the MPI message by encapsulating it within a set of packets and transmitting the packets of over the torus network of point-to-point links. Other parallel systems and other parallel computing libraries use similar mechanisms for transmitting messages between different compute nodes.

Figure 4:
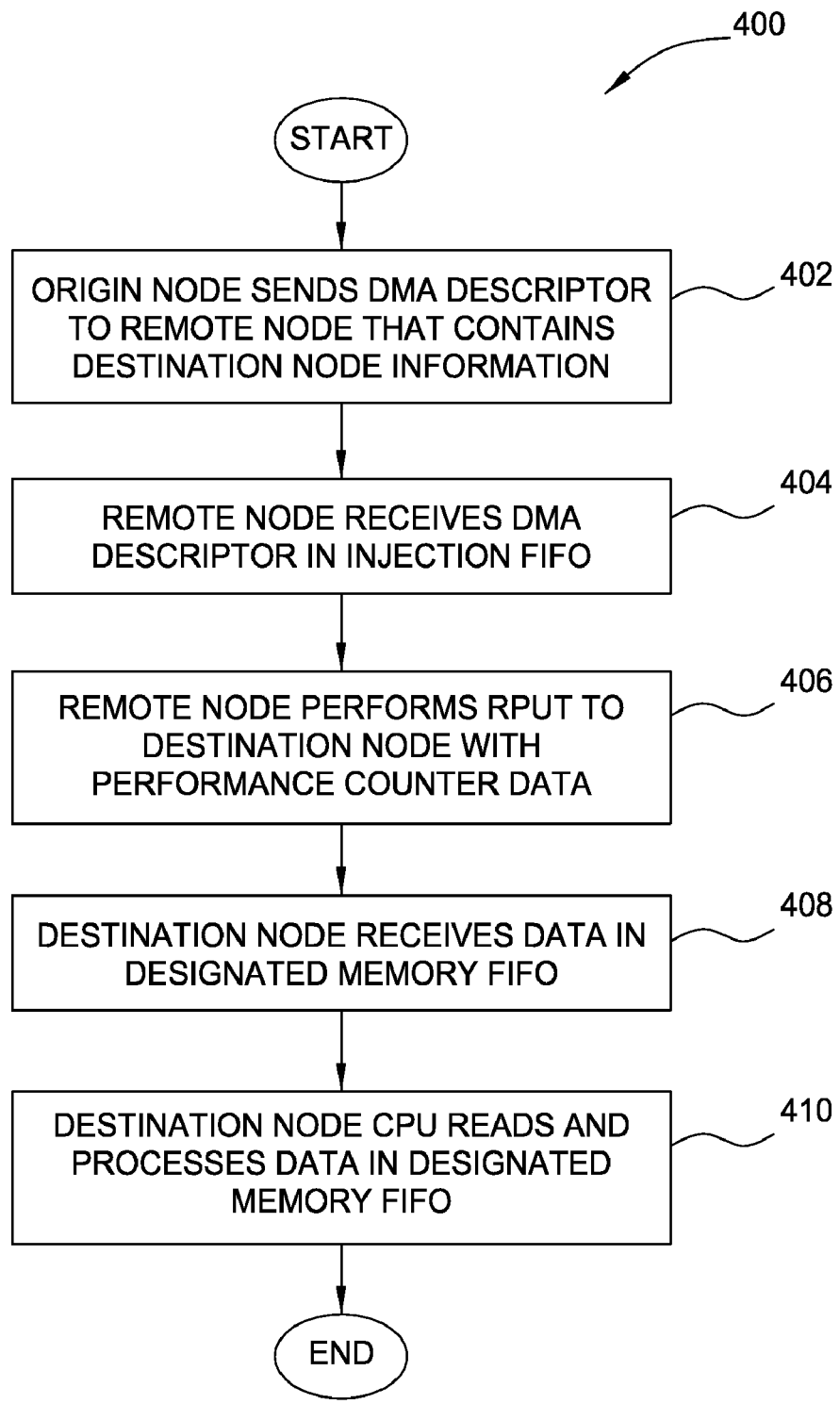
FIG. 4 is a flow diagram illustrating a method for unobtrusively retrieving performance counter data from a remote node.

FIG. 4 is a flow diagram illustrating a method 400 for unobtrusively retrieving performance counter data 320 from a remote node. As shown the method 400 begins at step 402, where an origin node sends a DMA descriptor to a remote node. In this example, the DMA descriptor may include an RPUT DMA descriptor to send performance counter data to the destination node. The origin node, remote node and destination node may all be different compute nodes 112 in the compute core 101. Note, however, that the origin node and the destination node may in fact be the same. The DMA descriptor may be transmitted by way of MPI messages, or using similar methods for transmitting messages between nodes.

At step 404, the remote node receives the DMA descriptor in its injection FIFO 318. As discussed above, the DMA controller 322 on the remote compute node processes the DMA descriptors in the injection FIFO 318 in the order they are inserted into the FIFO 318. At step 406, the DMA controller 322 on the remote node executes the RPUT DMA descriptor, transferring the performance counter data 320 to the destination node. At step 408, the destination node receives the performance counter data in a designated reception FIFO 324. A direct put message could also be used to insert the performance counter data directly into a specified memory buffer on the destination node.

At step 410, the processor cores 301 on the destination node read and processes the performance counter data stored in the memory FIFO. This may be the result of, e.g., an application 312 running on the destination compute node analyzing the performance counter data in order to monitor the performance of the remote node and react accordingly. For example, the application 312 may analyze the performance counter data to determine whether any of the counters exceed a threshold value. In such a case, the application 312 may conclude that the remote node is experiencing an unusually high amount of network congestion, and choose to route any future messages sent by the destination node around the remote node and through a less congested network path. Alternatively, the application 312 may choose to "report" this network congestion to a master node, as discussed in method 600 below.

Advantageously, the processing cores 301 on the remote node are not involved and thus not interrupted by the query for performance counter data. This occurs because the DMA controller 322 executes the DMA operation described by the DMA descriptor and sends the performance counter data to the destination node—without requiring intervention by the CPU cores 301. This advantage is compounded in a scenario when the processing cores 301 on a particular compute node 112 are overloaded with work. Here, the performance counter data is very important to detect that the particular node is overworked and to determine how it is handling that work (i.e., counters like cache misses). However, interrupting the processing cores 301 to get the performance counters simply increases the work for the processing cores 301 on the overworked node. Furthermore, if, for instance, there is a problem with one or both of the processing cores 301, attempting to query for performance counter data by normal means may fail, as the problematic processing cores 301 may be unable to service the request. By querying the performance counter data using method 400, other nodes are able to retrieve and analyze the performance counter data without interrupting the processing cores on the particular node, and are able to retrieve performance counter data even when the processing cores on the particular node are experience problems or have failed.

Figure 5:
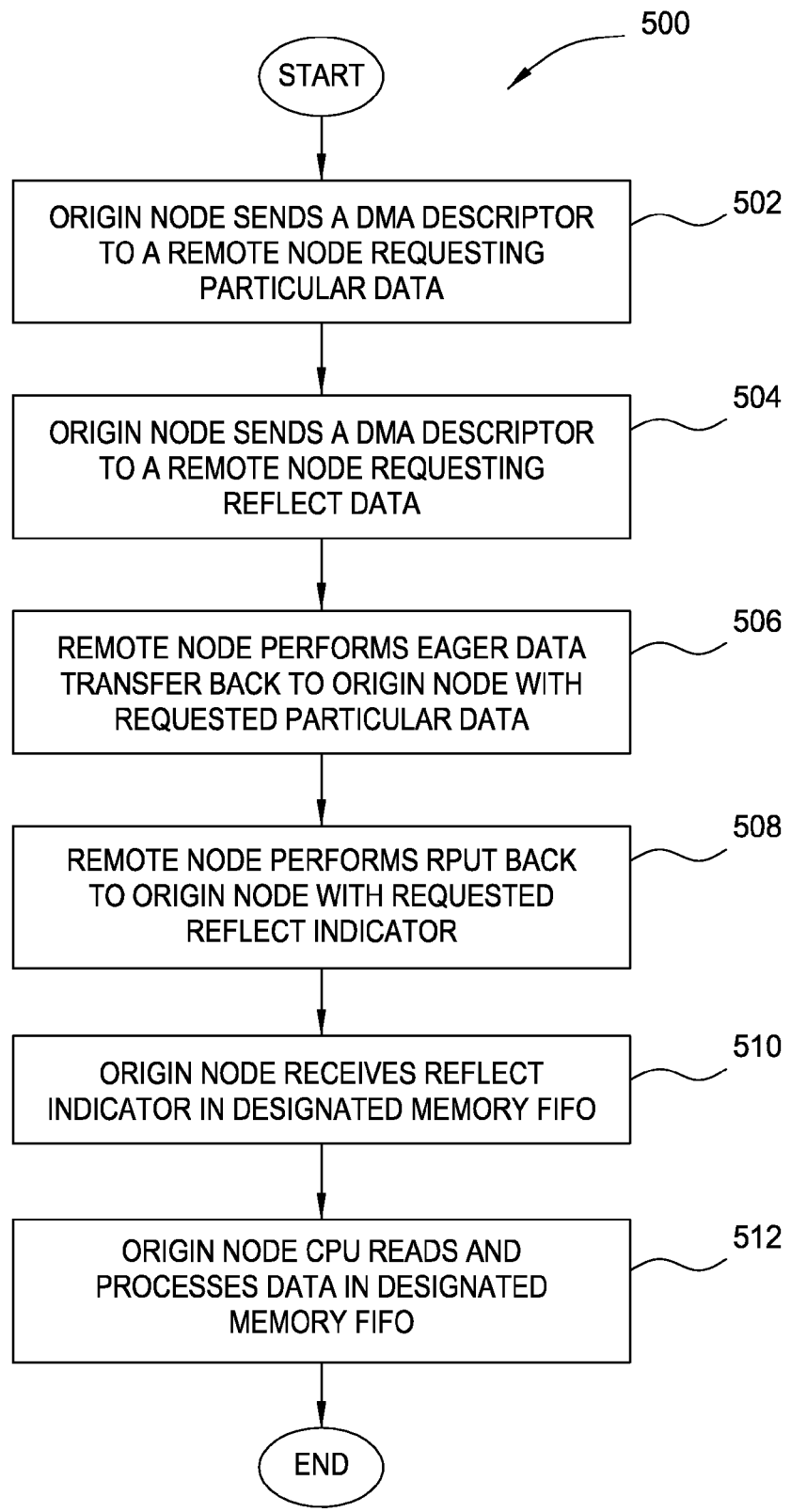
FIG. 5 is a flow diagram illustrating a method for performing a fence operation by retrieving performance counter data from a remote node.

FIG. 5 is a flow diagram illustrating a method 500 for performing a fence operation by retrieving performance counter data from a remote node. A fence operation is a synchronizing operation used to ensure that all previously executed operations between a current node and a designated node have completed. Method 500 illustrates an example using a network that employs deterministic routing (i.e. a message sent between two particular nodes will always be received before a subsequent message sent between those two nodes). As shown the method 500 begins at step 502, where the origin node sends a first DMA descriptor to the injection FIFO of a remote node. As discussed above, the injection FIFO 318 is processed by the destination node DMA controller 322 and the DMA operations described by the descriptors placed in the FIFO will be executed in the order they are received. In this particular example, the first DMA descriptor placed in the injection FIFO 318 is to send some particular data to the origin node. It is contemplated that this transfer may be an eager data transfer, a rendezvous data transfer or any other equivalent transfer method. At step 504, the origin node then sends a second DMA descriptor to injection FIFO 318 of the remote node, where the second DMA descriptor sends a reflect indicator back to the origin node. The reflect indicator is a predetermined value stored in a predetermined location on the origin node. The specific value and storage location for the reflect indicator are not important, so long as the origin node CPU knows which value to monitor for and where to look for the indicator. Put another way, the contents of the reflect indicator are not determinative, but rather the act of the origin node receiving the reflect indicator is important.

At step 506, the remote node executes the DMA operation described by the first DMA descriptor from its injection FIFO 318 and performs an eager data transfer back to the origin node with the requested data. Subsequently, at step 508, the remote node executes the DMA operation described by the second DMA descriptor and performs a second RPUT back to the origin node with the reflect indicator. At step 510, the origin node receives the reflect indicator, and thus knows the first RPUT has completed. In other words, because the network enforces deterministic routing and because the remote node processes DMA descriptors in its injection FIFO in the order they are received, the origin node CPU knows that the first RPUT has completed when it receives the reflect indicator from the second RPUT operation. Thus, the fence operation has completed, and so at step 512, the origin node CPU reads and processes the requested data sent from the remote node, knowing that the data transfer has completed.

By performing the fence operation in this way, the origin node has no need to consume CPU and memory resources maintaining a counter of sent and received packets in order to perform fence operations. While the resources required to keep such a counter between two nodes are somewhat minimal, the resources required to keep a counter on all nodes in the compute core 101 for each other node in the core 101 can be substantial. For instance, in a Blue Gene® system containing 65,536 nodes, each node would have to contain a counter for each of the other 65,535 nodes, consuming a substantial amount of memory on the node and also requiring the processing cores 301 to be interrupted each time a message is sent to another node in order to increment these counters. By using the method 500 discussed above, no counters are required to track how many messages have been sent to a particular node and how many messages have been received from that node, thus conserving memory space on each compute node 112. Furthermore, interruption of processing cores 301 is minimized, as the fence operation in method 500 consists mostly of DMA operations handled by DMA controller 322.

Figure 6:
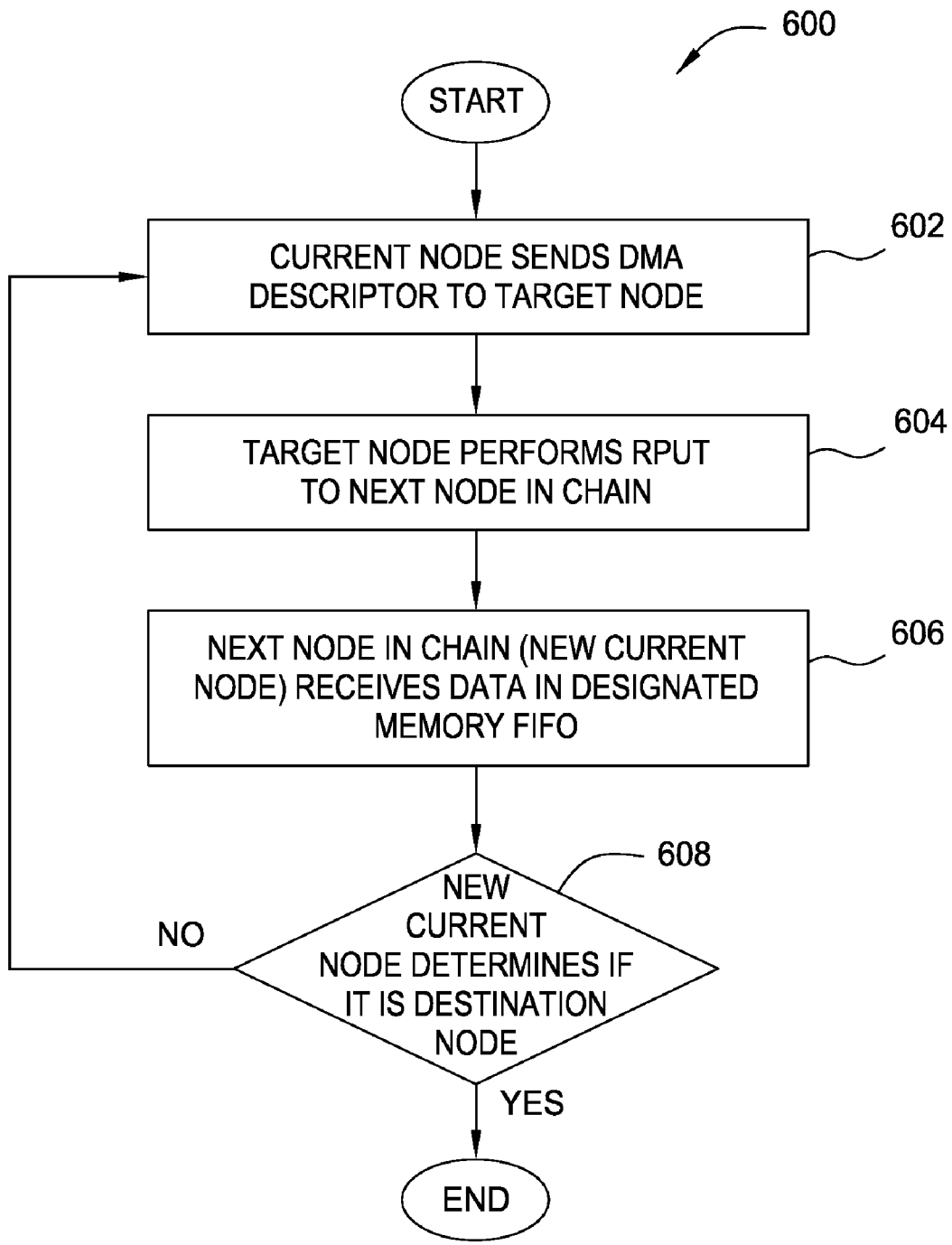
FIG. 6 is a flow diagram illustrating a method for unobtrusively retrieving performance counter data from a remote node and passing the performance counter data to a destination node.

FIG. 6 is a flow diagram illustrating a method 600 for unobtrusively retrieving performance counter data from a remote node and passing the performance counter data to a destination node. As shown the method begins at step 602, where the current node sends a DMA descriptor to the injection FIFO 318 of the target node. In this example, this DMA descriptor is a remote put descriptor that sends the performance counter data 320 on the target node to the designated next node in the chain. At step 604, the DMA controller 322 on the target node performs the RPUT operation with a DMA descriptor containing the performance counter data 320 to the next node in the chain (now referred to as the new current node). At step 606, the new current node receives the DMA descriptor containing the performance counter data in its injection FIFO 318. At step 608, the new current node determines whether it is the specified destination node. If it determines that is the destination node, then the method has completed and the destination node has received the performance counter data. If the new current node determines that it is not the destination node, then it sends the DMA descriptor containing the performance counter data to the injection FIFO 318 of the next node in the chain, and the method begins again step 602. Thus, by using the DMA controllers 322 and injection FIFOs 318 in this way, the compute nodes 112 may pass performance counter data to a destination node, such as service node 102, with minimal interruption to the processor cores 301 on the compute nodes 112.

Such a method may be used in a variety of different ways to monitor the compute core 101 and to relay performance counter data up to the service node 102 or to another designated node. For instance, the nodes may use a "neighborhood watch" approach, wherein each node monitors only its immediate neighbors. In such an approach, rather than having the service node 102 monitor each and every compute node 112 in the compute core 101 directly, the compute nodes 112 may instead report problems detected on neighboring nodes to the service node 102. For example, if a particular node detects a problem with one of its neighbors by fetching and examining the performance counter data of that neighbor, the particular node may then relay the problematic neighbor's performance counter data up to the service node 102 using method 600. By having each compute node 112 monitor its neighbors and report detected problems, the compute core 101 as a whole has better performance, as link contention is reduced by not having each and every node repeatedly ping the master with its own performance counter data.

While the foregoing is directed to embodiments of the present invention, other and further embodiments of the invention may be devised without departing from the basic scope thereof, and the scope thereof is determined by the claims that follow.

What is claimed is:

1. A method for querying performance counter data on a parallel computing system having a plurality of compute nodes, comprising:
   receiving, on a first compute node, from a second compute node, a first direct memory access (DMA) descriptor, wherein the first DMA descriptor identifies performance counter data to be sent to a third compute node, wherein the second compute node and the third compute node are the same compute node in the parallel computing system;
   inserting the first DMA descriptor into an injection queue on the first compute node;
   executing an operation described by the first DMA descriptor on the first compute node to determine the performance counter data;
   sending the performance counter data from the first compute node to the third compute node; and
   performing a fence operation for the second compute node, wherein the fence operation comprises:
      receiving a second DMA descriptor on the first compute node from the compute node, wherein the DMA descriptor includes a fence identifier for transfer to the second compute node, and wherein the second DMA descriptor is received after the first DMA descriptor;
      executing an operation described by the second DMA descriptor on the first compute node; and
      transferring the fence identifier from the first compute node to the second compute node.

2. A computer-readable storage medium containing a program which, when executed, performs an operation for querying performance counter data on a parallel computing system having a plurality of compute nodes, the operation comprising:
   receiving, on a first compute node, from a second compute node, a first direct memory access (DMA) descriptor, wherein the first DMA descriptor identifies performance counter data to be sent to a third compute node, wherein the second compute node and the third compute node are the same compute node in the parallel computing system;
   inserting the first DMA descriptor into an injection queue on the first compute node;
   executing an operation described by the first DMA descriptor on the first compute node to determine the performance counter data;
   sending the performance counter data from the first compute node to the third compute node; and
   performing a fence operation for the second compute node, wherein the fence operation comprises:
      receiving a second DMA descriptor on the first compute node from the compute node, wherein the DMA descriptor includes a fence identifier for transfer to the second compute node, and wherein the second DMA descriptor is received after the first DMA descriptor;
      executing an operation described by the second DMA descriptor on the first compute node; and
      transferring the fence identifier from the first compute node to the second compute node.

3. A parallel computing system, comprising:
   a plurality of compute nodes, wherein each compute node in the plurality of compute node includes at least a processor, a memory, and a DMA controller configured to perform a method for querying performance counter data from other compute nodes in the system by performing the steps of:
      receiving, on a first compute node, from a second compute node, a first direct memory access (DMA) descriptor, wherein the first DMA descriptor identifies performance counter data to be sent to a third compute node, wherein the second compute node and the third compute node are the same compute node in the parallel computing system, and wherein the program, when executed, further performs the steps of;
      inserting the first DMA descriptor into an injection queue stored in the memory on the first compute node;
      executing an operation described by the first DMA descriptor on the first compute node to determine the performance counter data;
      sending the performance counter data from the first compute node to the third compute node; and
   performing a fence operation for the second compute node, wherein the fence operation comprises:
      receiving a second DMA descriptor on the first compute node from the compute node, wherein the DMA descriptor includes a fence identifier for transfer to the second compute node, and wherein the second DMA descriptor is received after the first DMA descriptor;
      executing an operation described by the second DMA descriptor on the first compute node; and
      transferring the fence identifier from the first compute node to the second compute node.

* * * * *